(12) United States Patent  (10) Patent No.: US 8,135,923 B2
Haraden et al.  (45) Date of Patent: Mar. 13, 2012

(54) METHOD FOR PROTOCOL ENHANCEMENT OF PCI EXPRESS USING A CONTINUE BIT

(75) Inventors: Ryan S. Haraden, Rochester, MN (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/740,500

(22) Filed: Apr. 26, 2007

(65) Prior Publication Data

US 2008/0267001 A1 Oct. 30, 2008

(51) Int. Cl.
*G06F 12/00* (2006.01)
(52) U.S. Cl. ............ 711/154; 711/3; 711/144; 711/147; 711/200; 710/22; 710/26; 365/239
(58) Field of Classification Search ............... 711/3, 144, 711/147, 154, 200; 710/22, 26; 365/239
See application file for complete search history.

(56) References Cited

U.S. PATENT DOCUMENTS

| 5,392,239 | A * | 2/1995 | Margulis et al. ......... 365/233.18 |
| 2003/0126413 | A1 * | 7/2003 | El-Kik et al. ................. 712/225 |

OTHER PUBLICATIONS

"Understanding Burst Mode Flash Memory Devices", 2003, Advanced Micro Devices, Inc., Publication No. 23710, Revision A, Amendment 0. Retrieved on Dec. 17, 2009 from <http://www.amd.com/us-en/assets/content_type/white_papers_and_tech_docs/23710.pdf>.*
Jainandunsing, Kishan, "Intel Slashes OS Boot Up and Application Load Times With Robson", Mar. 2006, COM Express Source, Issue No. 3. Retrieved on Dec. 17, 2009 from <http://www.com-express-source.com/mar06/headline_mar06.php>.*
"Understanding Burst Modes in Synchronous SRAMs", 1999, Cypress Semiconductor Corporation. Retrieved on Dec. 17, 2009 from <http://www.cypress.com/?docID=4295>.*
AMD: "Am29BL162C" Data Sheet, pp. 1-49, Nov. 22, 2002 (Submitted as "Exhibit 1" with Response to 2d Office Action.).

* cited by examiner

*Primary Examiner* — Arpan P. Savla
(74) *Attorney, Agent, or Firm* — Bockhop & Associates LLC

(57) ABSTRACT

In a method for enabling a root device to access a plurality of memory locations in an address space in an endpoint device, a first access is sent to the endpoint device by transmitting a first header and a first address. The header includes a continue bit that is set at a first state that indicates that the first access is accessing a selected first memory location that the address is being sent. A first memory location is accessed when the continue bit is in the first state. A second access, which accesses accessing a second memory location that is contiguous to an immediately previously accessed memory location, is sent to the endpoint device by transmitting a header that includes a continue bit set to a second state and not sending an address. The second memory location corresponds to the first address plus a predetermined address offset.

6 Claims, 2 Drawing Sheets

METHOD FOR PROTOCOL ENHANCEMENT OF PCI EXPRESS USING A CONTINUE BIT

BACKGROUND OF THE INVENTION

1. Field of the Invention

The present invention relates to digital communication systems.

2. Description of the Prior Art

Multi-lane digital communications systems allow computer processors to communicate with a variety of other devices in a highly flexible manner. Such systems employ a plurality of different data channels (sometimes referred to as "lanes") that communicate with all of the devices in a network. A lane is a serial point-to-point connection that connects a "root" device to an "endpoint" device. The lanes can be configured as serial data channels, or they can be grouped together to act as parallel data busses, depending on the requirements of the specific device connected to the system.

One type of multi-lane digital communication system is referred to as "PCI Express." PCI Express is a digital communications bus that allows expansion cards to be added to a computer system. PCI Express allows data transfer over 32 different lanes. Each PCI express Gen 1 lane allows a data transfer rate of 250 MB per second (thus the total data transfer rate for all lanes is 8 GB per second). PCI Express also includes a plurality of serial interconnects. A single hub with many pins connects a central unit (such as the mother board of a computer) to the PCI Express bus.

The PCI Express communications protocol is layered. The layers include a transaction layer, a data link layer; and a physical layer. The physical layer is divided into a logical sublayer and an electrical sublayer. The logical sublayer is frequently further divided into a physical coding sublayer (PCS) and a media access control (MAC) sublayer. In the electrical sublayer, each lane includes two unidirectional low voltage differential signaling (LVDS) conductor pairs that transmit data at 2.5 gigabits per second. Transmit and receive functions use different LDVS pairs, resulting in four conductors per lane.

PCI Express sends all control messages, including interrupts, over the same links used for data. Typically, the serial protocol can never be blocked. Data transmitted on multiple-lane links is interleaved so that each successive byte is transmitted on a different lane in a process referred to as "data striping."

The Data Link Layer (DLL) sequences transaction layer packets (TLPs) that are generated by the transaction layer. The DLL also provides data protection via a 32-bit cyclic redundancy check code (referred to as "LCRC") and an acknowledgement protocol. When a TLP passes an LCRC check and a sequence number check, an acknowledgement (ACK) is returned. When a TLP fails the LCRC check, a negative acknowledgement (NAK) is sent. TLPs that result in a NAK, or timeouts that occur while waiting for an ACK, result in the TLPs being replayed from a buffer in the transmit data path of the DLL. ACK and NAK signals are communicated via a low-level packet known as a data link layer packet, or DLLP. DLLPs are also used to communicate flow control information between the transaction layers of two connected devices, as well as some power management functions.

PCI Express is a High Performance/High Bandwidth protocol. However like many protocols, it suffers efficiency problems when transmitting small packets. Thus, to create a high performance design one must send large packets across the express link. At odds with this is the Cache line size in many processors so that many root ports only supported small packet sizes, which in turn has cause many devices to only support small packet sizes, reducing the performance characteristics of the protocol.

Current multi-lane systems require an address to be sent from the root device to the endpoint device each time a memory access occurs. However, many sequential accesses are to sequentially contiguous memory locations. For example, a first access might be to a first memory location, a next access might be to a memory location that is next to the first location. However, the root device will send an address during both memory accesses. The sending of the address can consume a substantial amount of time during a memory access, especially when many small packets are being accessed.

Therefore, there is a need for a system that eliminates the need for sending an address when accessing contiguous memory locations during subsequent memory accesses.

SUMMARY OF THE INVENTION

The disadvantages of the prior art are overcome by the present invention which, in one aspect, is a method for enabling a first device to access a plurality of memory locations in an address space in a second device, in which a plurality of memory addresses correspond to each of the memory locations. A first access is sent to the second device by transmitting a first header and a first address. The header includes a continue bit that is set at a first state that indicates that the first access is accessing a selected first memory location that the address is being sent. A first memory location corresponding to the first address is accessed when the continue bit is in the first state. At least one second access is sent to the second device by transmitting a second header and not sending an address. The second header includes a continue bit set to a second state, different from the first state, that indicates that the second access is accessing a selected second memory location that is contiguous to an immediately previously accessed memory location. The second memory location corresponds to the first address plus a predetermined address offset is accessed when the continue bit is set to the second state.

In another aspect, the invention is a method of communicating with a memory device, in which a first memory location is accessed by transmitting an address to the memory device. At least one second memory location is accessed by transmitting to the memory device an indication that the second memory location is contiguous to the first memory location without transmitting a subsequent address to the memory device.

In yet another aspect, the invention is a digital system in which a plurality of devices communicates via a multi-lane digital communication system. An endpoint device includes a memory space and a circuit that detects a state of a continue bit. The endpoint device is configured to provide access to a memory location that corresponds to an access location. The access location is a received memory address when the continue bit is set to a first state. The access location includes an immediately previously accessed access location plus a predetermined offset when the continue bit is set to a second state, different from the first state. A root device is configured to access the memory space by sending an access data packet to the endpoint device. The access data packet includes an address and the continue bit set to the first state when the root device is accessing a first of a contiguous set of memory locations in the memory state. The access data packet includes the continue bit set to the second state when the root device is accessing a subsequent memory location of the contiguous set of memory locations.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
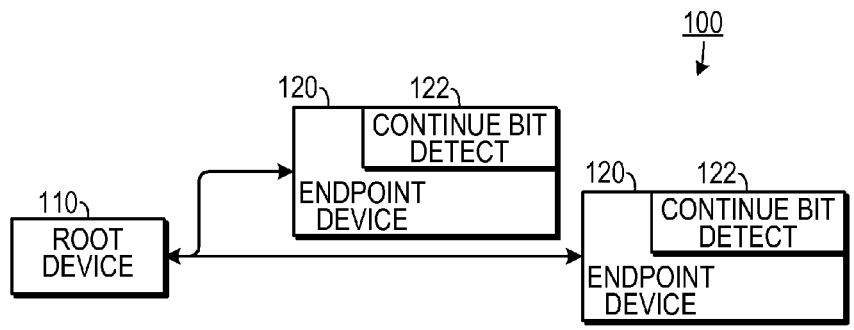
FIG. 1 is a schematic diagram of one embodiment.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment is a multi-lane digital communication system 100, such as PCI Express. (However, it is understood that the scope of the claims will extend to embodiments that employ non-multi-lane systems.) The system 100 includes a root device 110 that is in data communication with at least one endpoint device 120. Each endpoint device 120 includes logic 122 that is configured to detect whether a predetermined continue bit is set to a first state (such as "0") or a different second state (such as "1"). When the root device 110 sets the continue bit to the first state when accessing the memory space of an endpoint device 120, the endpoint device 120 will interpret a portion of the data being sent by the root device 110 as an address. The endpoint device 120 will then allow the root device 110 to access the memory space of the endpoint device 120 at the address. On the other hand, when the root device 110 sets the continue bit to the second state, the endpoint device 120 will not expect an address from the root device 110 and will allow the root device 110 to access its memory space at an address that is equal to the last accessed address plus a predetermined offset.

The predetermined offset will correspond to the width of the memory space of the previous access. When accessing memory space in the endpoint device 120, the root device 110 will transmit to the endpoint device 120 a header that includes the width of the memory space currently being accessed. The endpoint device 120 will store the previously-accessed address and the width. On a next access in which the continue bit is set to the second state, the endpoint device 120 will set the current address to a value corresponding to the previously-accessed address plus the width of the previously-accessed memory space and then allow access to the new current address.

In certain applications, access will be to successively decrementing address locations. In such applications, the offset may be reported as a negative number, or a flag in the header may be set to indicate that the address is to be decremented by the offset rather than incremented.

Figure 2A:
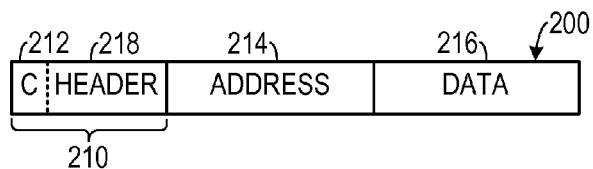
FIGS. 2A-2B are a schematic diagrams of data packets.
Figure 2B:
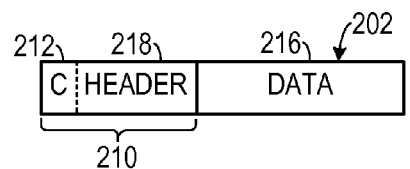

A simplified example of an access packet 200 that is initially sent by the root device 110 is shown in FIG. 2A. The access packet 200 includes a header 210 that uses a selected bit as a continue bit 212. The header could also include additional information 218 regarding the width of the address space currently being accessed, the specific root device being accessed, whether the access is a read access or a write access and other administrative information. If the continue bit 212 is set to the first state, the access packet 200 will include an address 214 and, if the access is a write access, data 216 to be written. On the other hand, as shown in FIG. 2B, if the continue bit 212 is set to the second state, the access packet 202 will not include an address.

Figure 3:
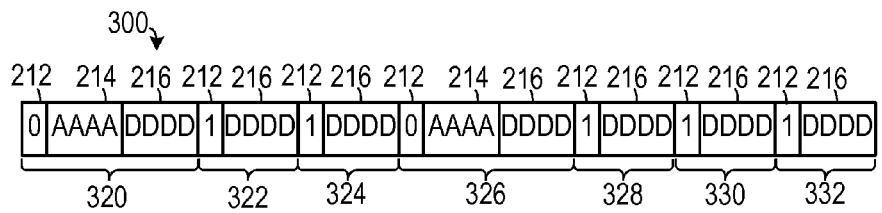
FIG. 3 is a schematic diagram of a plurality of subsequent data packets.

A typical write sequence 300 of access data packets that could be sent by a root device to an endpoint device is shown in FIG. 3. In this sequence 300, an initial access packet 320, sent by the root device, includes a continue bit 212 set to "0" to indicate that data 216 is being sent to a first address 214. (For the sake of simplicity, the rest of the header is not shown in this example.) A second access packet 322 is sent in which the continue bit is set to "1" to indicate that the data 216 is to be written to an address that is contiguous with and offset by a predetermined amount from the address 214 accessed by the first access packet 320. In a third access packet 324, the continue bit 212 is also set to "1" to indicate that the data 216 is to be written to an address that is contiguous with and offset by a predetermined amount from the address accessed by the second access packet 322. In a fourth access packet 326, the continue bit 212 is set to "0," which indicates that access is to an address 214 that is non-contiguous with the immediately previously accessed address. In three subsequent accesses 328, 330 and 332, the continue bit 212 is set to "1" to indicate that they each seek to access contiguous memory locations.

Figure 4:
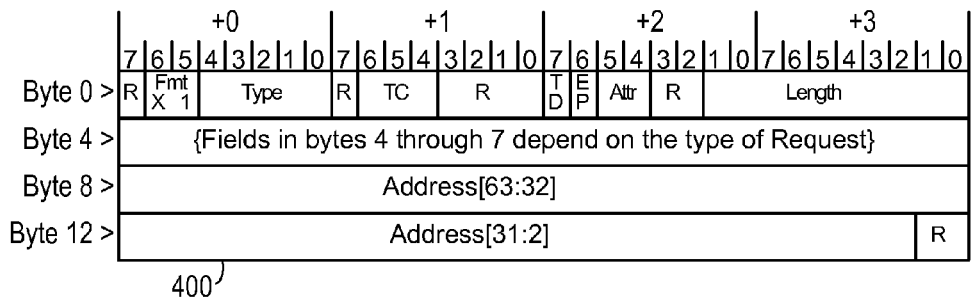
FIG. 4 is a schematic diagram of a detailed bit allocation of a data packet.

An example of a commonly used access packet 400 is shown in FIG. 4. This access packet 400 has several bits that are not currently being used. For example bit 7 in byte 0, bits 0-3 in byte 1, and bits 2-3 in byte 2 are "reserved" bits, any one of which could be used as a continue bit.

Figure 5A:
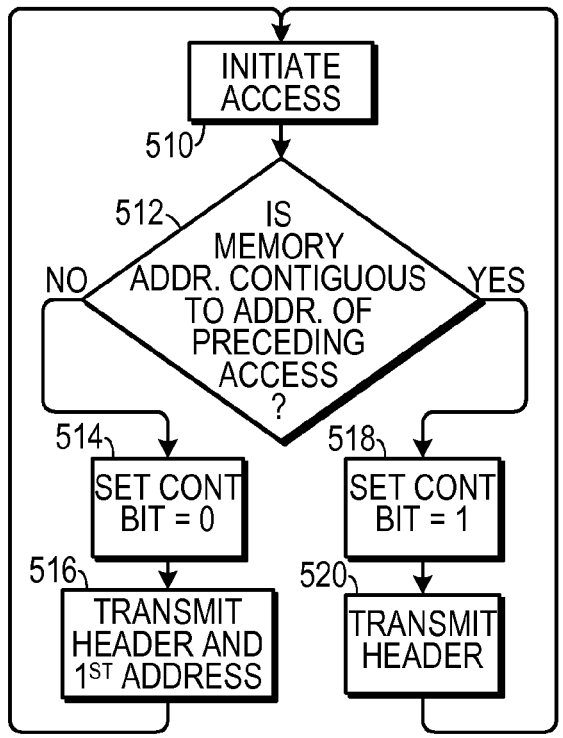
FIG. 5A is a flow chart showing actions taken by a root device.

The root device could employ the method shown in FIG. 5A to assemble access packets. Upon initiating an access to an endpoint device 510 the root device determines if the memory address being accessed is contiguous to the address of an immediately preceding access 512 and, if not, will set value of the continue bit in the header to "0" 514. The root device will then transmit an access packet that includes at least the header and the address to be accessed. If, on the other hand, the access is to a next contiguous address, the root device will set the continue bit to "1" 518 and will transmit the header without transmitting the address 520.

Figure 5B:
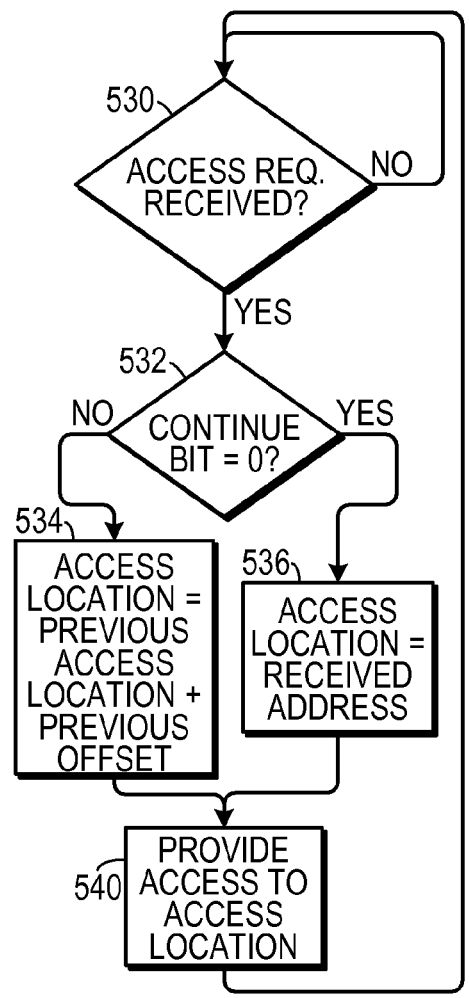
FIG. 5B is a flow chart showing actions taken by an endpoint device.

In response to accesses from the root device, the endpoint device could employ the method shown in FIG. 5B, in which when an access request is received 530 the endpoint device determines if the continue bit is set to "0" 532. If so, the endpoint device will set the access location to the address received from the root device 536. If the continue bit is set to "1," then the endpoint device will set the access location to an address equal to the previously accessed address plus an offset equal to the data width of the previously-accessed data packet 534. The endpoint device will then permit access to the current access location 540.

An additional enhancement to would be to make the initial write or read non-standard, which would then allow the reads and writes to be non-sequential. This would allow certain unrelated operation to transverse the bus without causing an address update. Such an additional feature would then require two additional bits (a "special continues enabled" bit and a "special continues supported" bit) but otherwise the system would function in the same manner as described above.

If one assumes that a system is performing 64 byte writes using 4 double word headers, the performance enhancement results in an 89% packet efficiency (as opposed to a 75% packet efficiency using existing systems). Read requests are 33% (using a 3 double word protocol) or 50% (using a 4 four double word protocol) more efficient. Thus, the disclosed embodiment significantly reduces link overhead with a minor protocol enhancement.

While the exemplary embodiments disclosed above show a root device accessing the memory space of an endpoint device, it should be understood that other embodiments may be employed in which an endpoint device is accessing the memory space of a root device and that certain embodiments would allow both types of access. It is intended that the scope of the claims that follow extends to all such embodiments.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for enabling a first device to access a plurality of memory locations in an address space in a second device, in which a plurality of memory addresses correspond to each of the memory locations, the method comprising the actions of:

a. sending over a single lane of a multi-lane digital communications system a first access data packet to the second device by transmitting a data packet that includes a first header, that includes a width of an address offset, and a first address, the first header including a continue bit that is set at a first state that indicates that the first access is accessing a selected first memory location at the address in the first header;
   b. accessing via the single lane a first memory location corresponding to the first address when the continue bit is in the first state;
   c. sending over the single lane of a multi-lane digital communications system at least one second access data packet to the second device by transmitting a second header and not sending an address, the second header including a continue bit set to a second state, different from the first state, that indicates that the second access is accessing a selected second memory location that is contiguous to an immediately previously accessed memory location; and
   d. accessing via the single lane a second memory location corresponding to the first address plus the width of the address offset when the continue bit is set to the second state.

2. The method of claim 1, wherein the first device comprises a root device and wherein the second device comprises an endpoint device.

3. The method of claim 1, wherein the first device comprises an endpoint device and wherein the second device comprises a root device.

4. The method of claim 1, wherein the first access and the second access both comprise read accesses.

5. The method of claim 1, wherein the first access and the second access both comprise write accesses.

6. The method of claim 1, wherein the multi-lane digital communication system comprises PCI Express.

* * * * *